United States Patent [19]

Richardson

[11] 4,446,418

[45] May 1, 1984

[54] GENERATOR AND DRIVE SYSTEM

[76] Inventor: Royest L. Richardson, 305 W. Home, Flint, Mich. 48505

[21] Appl. No.: 338,506

[22] Filed: Jan. 11, 1982

Related U.S. Application Data

[63] Continuation-in-part of Ser. No. 100,952, Dec. 6, 1979, abandoned.

[51] Int. Cl.³ .............................................. H02K 7/02
[52] U.S. Cl. .......................................... 322/4; 310/74
[58] Field of Search ................... 310/74, 68 E; 322/4; 74/572

[56] References Cited

U.S. PATENT DOCUMENTS

| | | | |
|---|---|---|---|
| 3,679,960 | 7/1972 | Hirokawa et al. | 322/4 |
| 3,683,216 | 8/1972 | Post | 310/74 X |
| 4,223,240 | 9/1980 | Theyse | 310/74 |

*Primary Examiner*—Donovan F. Duggan
*Attorney, Agent, or Firm*—Harry R. Dumont

[57] ABSTRACT

A generator system for producing an electrical power output or for providing rotary motion for a drive system. The system includes a central shaft supported on bearings for free rotation. The shaft further includes a flywheel and a vibratory gyroscope mounted on it for storing energy. A drive means is used to apply torque to the shaft to cause it and the flywheel to rotate up to speed. A further coil is mounted on the shaft co-operable with opposed magnets to provide an electrical power output to an external load. Also a mechanical power output may be taken from the shaft for an external drive.

10 Claims, 4 Drawing Figures

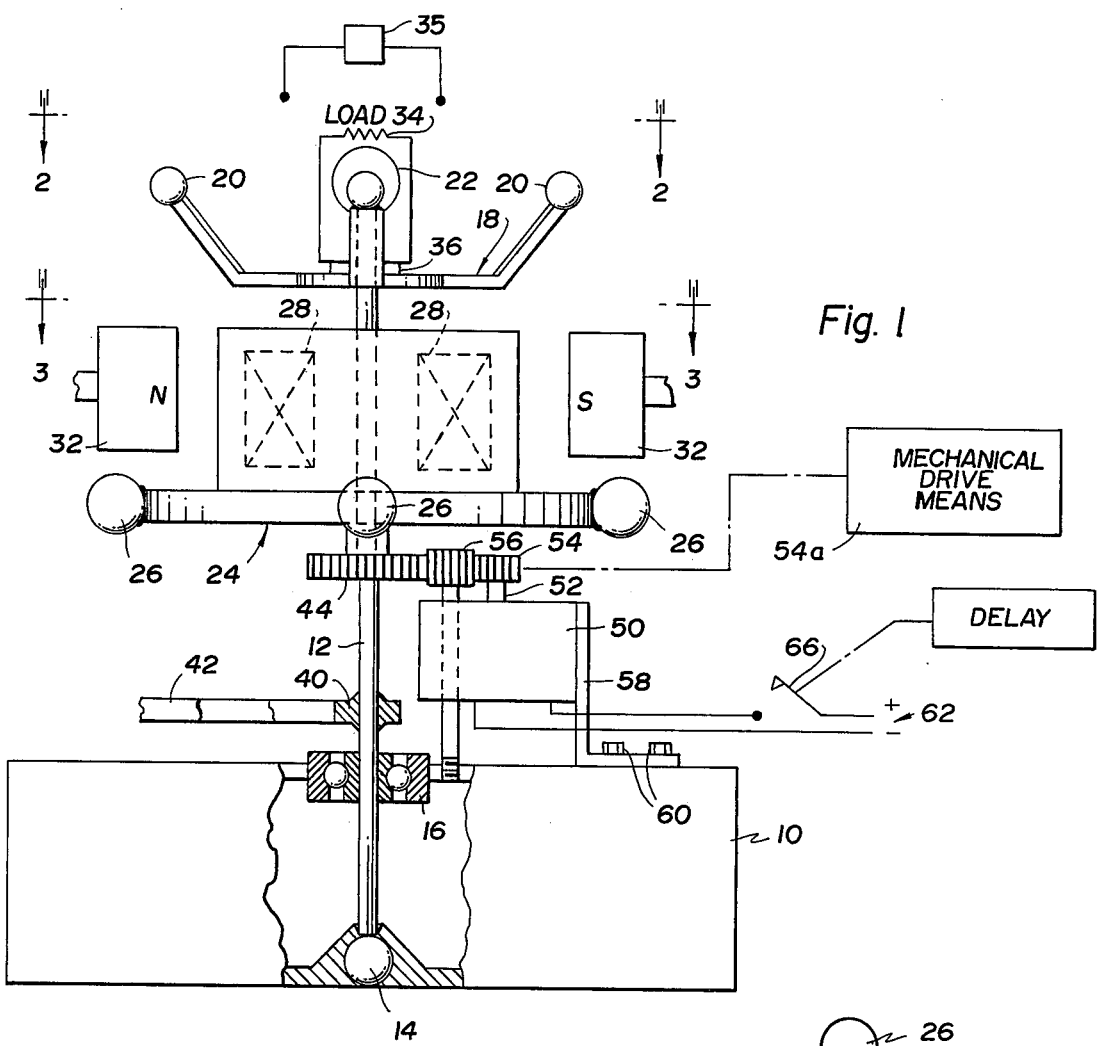
Fig. 1
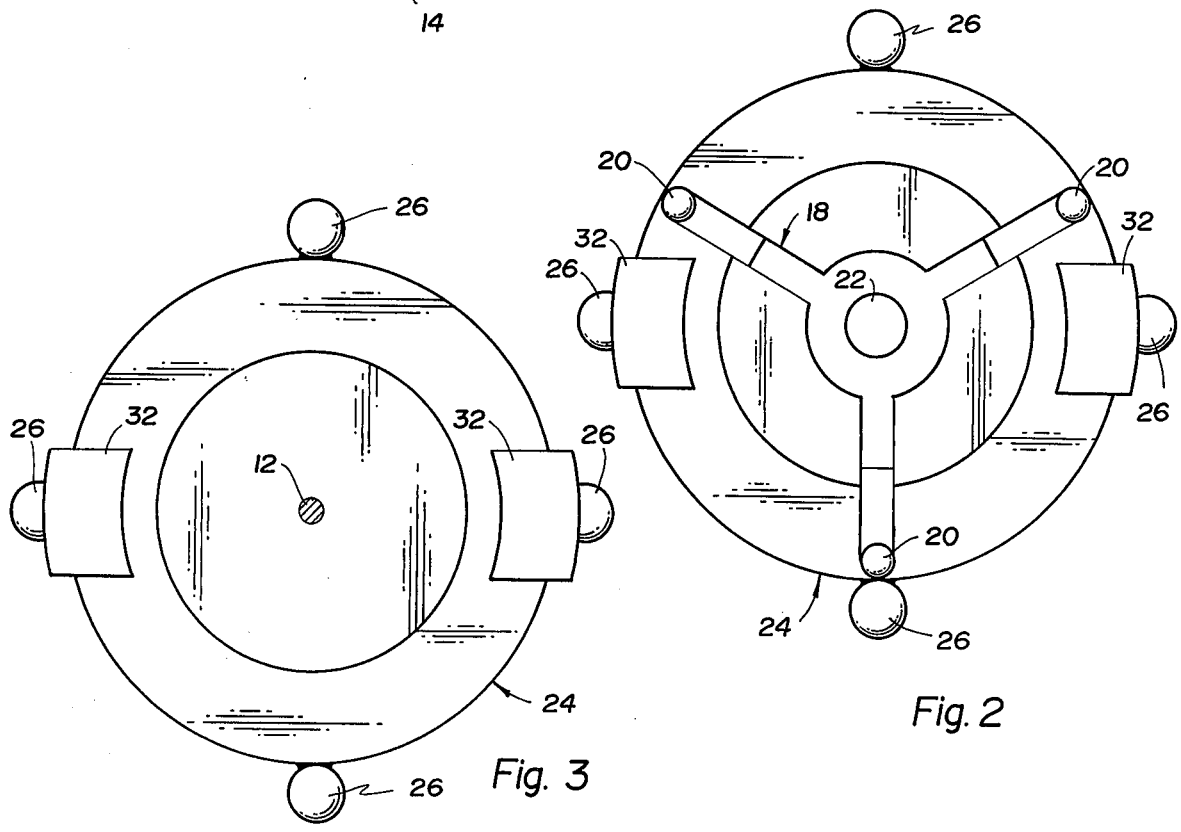
Fig. 2
Fig. 3

GENERATOR AND DRIVE SYSTEM

This application is a continuation-in-part of U.S. Pat. application Ser. No. 100,952, filed Dec. 6, 1979, now abandoned.

BACKGROUND OF THE INVENTION

This invention relates to a generator system which operates from a specialized mass system including a shaft on a base and bearing a coil rotatable through a magnetic field. The shaft is driven by an external motor means up to a relatively high speed rotation that allows slow-down while its rotation is prolonged due to the flywheel effect of an associated flywheel mechanism mounted on a shaft. The flywheel in the system reintroduces energy into the total system. The flywheel can be constructed of a number of different materials. The weight may be concentrated in the perimeter or near the center depending on the output desired. It may be desirable to employ a flywheel which contains a liquid in a central cavity so that as the flywheel spins, the liquid is concentrated in its perimeter and, as it slows, the liquid moves back to its center. In the system the flywheel, the liquid and the vibratory gyroscope provide a mechanical energy input needed to sustain the system. The speed of rotation is further maintained by the effect of a vibratory gyro at one end of the shaft.

The vibratory gyroscope differs from the conventional gyroscope both in its method of construction and in it type of operation. A plurality of weights are fixed to flexible rods and as the rod vibrates back and forth gyroscope characteristics are exhibited. When two or more flexible rods with their respective attached weights are constructed to terminate in a single rod and base, the gyrations of the weights cause a twisting motion at the base which in turn causes the weights to be sent into an elliptical orbit. The twisting motion that arises in the base plate is used in the total system. The breadth of the ellipse is proportional to the rate of the turn. As the vibratory gyroscope turns, the flexible rods begin to deflect in an elastic manner and fan out. This fanning action stores some of the energy imparted by the centrifugal spin. The stored energy is given back to the system if the input supply is interrupted. In this manner the power is initially input in a small amount while the speed of rotation during operation of the system is maintained by the above elements. Preferably a delay means is included in the system for interrupting the input power means while the rotation is being continued, primarily by flywheel stored energy. It is then resumed to again power the shaft up to speed. Many generator systems are known which are powered by water power, solar energy, and wind driven energy. These have the common problem of requiring expensive storage batteries for temporarily holding the electrical energy before it is used. My invention provides a system which does not require the use of electrical batteries or other electrical storage means in the system.

SUMMARY OF THE INVENTION

The present invention will be seen to provide a simple motor generator system in which power output is relatively high as compared to input and a constant level of output is effectively maintained by a novel combination of mechanical and electrical elements. It is possible to take either an AC or DC output from the generator. It is also possible to take a mechanical power output from the shaft by a belt, gearing or similar power output means.

BRIEF DESCRIPTION OF THE DRAWINGS

My invention will now be described in the accompanying specification with reference to the drawings with like numerals employed where like parts are repeated in the several views and in which:

FIG. 1 is a showing of the motor generator system partly in schematic form and with parts broken away;

FIG. 2 is a sectional view taken along the section lines 2—2 of FIG. 1;

FIG. 3 is a sectional view taken along the section lines 3—3 of FIG. 1; and

DETAILED DESCRIPTION OF THE PREFERRED EMBODIMENT

Figure 4:
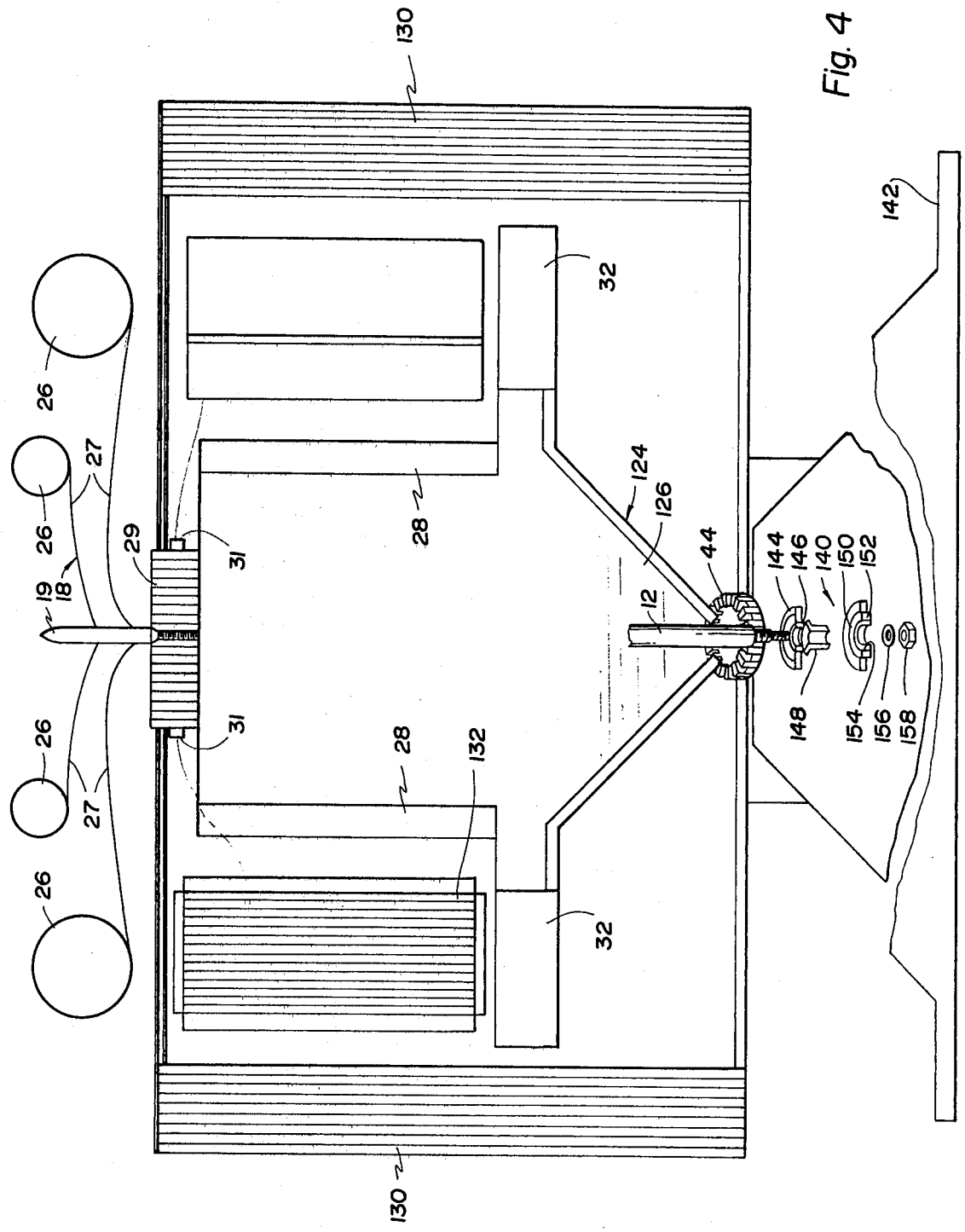
FIG. 4 is a fragmentary combined sectional and diagrammatic drawing of an alternate embodiment of this invention.

Shown in FIG. 1 is a base 10 which rotatably supports a substantially vertical shaft 12. The shaft 12 is supported for rotation at its lower end on a ball bearing support 14 and intermediate along its length by a further ball bearing 16. It will be understood that low friction bearings of the hydrostatic or the hydrodynamic type may be used in place of ball bearings 14 and 16. The shaft 12 has mounted on it at its upper end a gyro 18. The gyro 18 includes three peripheral weights 20 as best shown in FIGS. 1 and 2. An upper weight 22 is included with the gyro end 20.

The shaft 12 has mounted intermediate its ends a flywheel 24 which carries four peripheral weights 26 as best shown in FIGS. 1 and 3. Mounted above the flywheel 26 is a coil 28 likewise fixed to the shaft 12. A plurality of permanent or electro magnets 32 are supported in spaced relationship to the coil 28 as shown. It will be understood that the rotation of the shaft carrying with it the coil 28 will cause an EMF to be induced in the coil 28. This electrical potential is available for use in external load devices.

For example, if the generator system is used in a residence or commercial building, the load which would use power take-off is shown in generalized form as load 34. Load 34 may be electrical lighting devices, electrical motors, or indeed any other device using electrical power. If the system is used in conjunction with a propulsion system for a vehicle, load 34 would be embodied as a traction motor 35 to drive the vehicle. Electrical power take-off from the coil 28 may be made through slip rings or commutator 36 in the manner shown in FIG. 1.

Provision is also made for take-off of a rotary mechanical energy from a hub 40 fixed to the shaft 12. As shown in FIG. 1, this take-off is by means of belt 42 which may be used to turn connected shafts, wheels, or other devices.

The power input to rotate the shaft 12 up to speed is provided through a gear 44 fixed to the shaft 12 intermediate its ends. An electrical motor 50 shown with an output shaft 52 and an output gear 54 in engagement with a further intermediate gear 56 to provide rotative drive to the gear 44 and thus to the vertical shaft 12. The motor 50 is preferably a fractional horsepower motor mounted to an upstanding support 58 which in turn is fixed to the base 10 through bolts or other fasteners 60. The motor 50 is operated from an external AC or DC power source 62. Alternately, or supplementarily a rotative input may be furnished from an input mechanical drive means 54a which may be a windmill or waterwheel drive input device.

It will be understood that the input from the motor 50 is only periodically required and at timed intervals which may be predetermined by the number of coils, power level, number of teeth on gear 44 and other physical factors. Thus a delay device such as an electro-magnetic delay device 64 may be used to periodically open and close a switch 66 included in the circuit between the power source 62 and the motor 50. Accordingly, the shaft 12 is periodically driven up to a predetermined time period while the rotation of the shaft 12 continues largely due to the effect of the flywheel 28 and also of the gyro 18. After the predetermined time period has passed, switch 66 will be closed and the cycle repeated.

FIG. 4 shows a different embodiment of my invention in which the flywheel 24 is of a different type. It includes a central reservoir with fluid 126 as shown. At higher speeds of rotation the fluid is forced to the periphery of the reservoir. When the rotation slows, the fluid 126 returns to the central part of the reservoir. The vertical shaft 12 is fixed to the flywheel 124. The generator coil 28 is mounted above the flywheel for rotation with it. The vibratory gyro 18 is attached to the top of the assembly and includes a plurality of weights 26, each mounted on a central pin 19 by its respective flexible rod 27. The pin 18 is attached to the base 29 as shown. A suitable commutator 29 and brushes 31 are included in the base 29 as shown for power take-off. A gear 44 is fixed to the lower portion of the shaft 12 to receive rotative drive from an electrical motor, air or water turbine wheel or the like, in the manner shown in connection with the FIG. 1 embodiment. A plurality of spaced permanent magnets 32 are also mounted marginally on the flywheel 124.

The system of FIG. 4 also includes an inner generator coil 28 mounted on the flywheel 124 for rotative movement with it. One or more outer stationary coils 130 may be included. A plurality of electromagnets 132 are included as shown. When current is flowing in the windings of the electromagnets 132, a reaction occurs which turns the generator into a motor to help drive itself. A magnetic bearing 140 is used to rotatively mount the lower end of the shaft 12 on a stand 142. Included in the magnetic bearing 140 are a fringing ring 144, a rotor pole 146, and a frame piece 148. The device also includes a permanent magnet 150, an outer stator pole 152, an inner stator pole 154 and an associated control coil. The bearing 140 is connected to the threaded end of the shaft by a washer 156 and nut 158.

Thus it will be seen that I have provided by my invention a fully balanced generator system which minimizes the effects of friction and is operable to provide a high torque, high power output with a minimum of power input. The system is particularly well adapted for propulsion of a vehicle without requiring an intermediate electrical storage battery.

I claim:

1. A generator system for providing an electrical power output, comprising:
   a central shaft;
   a support bearing for rotatably supporting said shaft at its lower end;
   a flywheel mounted on said shaft intermediate its end;
   an input means for providing a rotative drive to said shaft;
   a gyro of the vibratory type mounted on said shaft proximate its upper end; said gyro including a plurality of relatively thin rods extending symmetrically from said shaft, each such rod including a weight mounted on its free end; and
   means for periodically interrupting the drive to said shaft, said flywheel and said gyro operable to continue the rotation of said shaft during such periodic interruption.

2. The combination as set forth in claim 1 wherein said means for applying rotative drive to said shaft includes an electrical motor, a power source for operating it, and a switch periodically operated for connecting said source to said electrical motor.

3. The combination as set forth in claim 2 wherein a delay means is operably connected to said switch for operating it for a predetermined time interval.

4. The combination as set forth in claim 1 wherein said flywheel is of the liquid containing type.

5. The combination as set forth in claim 1 including an inner coil rotatably with said flywheel and an outer stationary coil.

6. The combination as set forth in claim 1 wherein an electrical output is taken from said shaft by a commutator means.

7. The combination as set forth in claim 1 wherein said shaft is supported at its lower end by a ball bearing means.

8. The combination as set forth in claim 1 wherein said bearing means is of the magnetic bearing type.

9. The combination as set forth in claim 1 wherein said input means for providing a rotative drive to said shaft comprises a turbine mechanical drive means.

10. The combination as set forth in claim 5 wherein a plurality of spaced permanent magnets are mounted juxtaposed to said inner coil.

* * * * *